United States Patent [19]
Peterson

[11] 3,752,296
[45] Aug. 14, 1973

[54] HYDRAULICALLY OPERATED ELEVATOR FEEDER

[75] Inventor: Virgil V. Peterson, Paton, Iowa

[73] Assignees: Dean W. Mitchell, Des Moines; James B. Smith, Perry, Iowa ; part interest to each

[22] Filed: Dec. 27, 1971

[21] Appl. No.: 211,969

[52] U.S. Cl. .............................................. 198/94
[51] Int. Cl. ............................................. B65g 37/00
[58] Field of Search ................... 198/88, 87, 93, 94, 198/97, 99

[56] References Cited
UNITED STATES PATENTS

| | | | |
|---|---|---|---|
| 3,493,136 | 2/1970 | Spellman, Jr. | 198/94 |
| 2,812,867 | 11/1957 | Anderson | 198/87 |
| 2,808,923 | 10/1957 | Rogers | 198/87 |
| 2,538,308 | 1/1951 | Grahl | 198/87 |
| 1,420,118 | 6/1922 | McAllister | 198/94 |

Primary Examiner—Richard E. Aegerter
Assistant Examiner—Joseph E. Valenza
Attorney—Zarley, McKee & Thomte

[57] ABSTRACT

A baled hay and grain elevator having a feeder section hydraulically powered by a double acting hydraulic power cylinder to pivotally move and hold the feeder section at any desired position. The double acting power cylinder is positioned between upstanding frame side members on the elevator and feeder sections which are pivotally interconnected by connecting members extending inwardly and upwardly. Hydraulic cylinder is operatively connected to the upstanding frame on the elevator section and intermediate the ends of the connecting member associated with the other upstanding frame member. A telescoping guide member extends between the elevator section and the feeder section. The conveying means on the elevator section and feed section is powered by a power take-off on a tractor which also includes a hydraulic system for operating the double acting cylinder.

7 Claims, 4 Drawing Figures

Patented Aug. 14, 1973
3,752,296
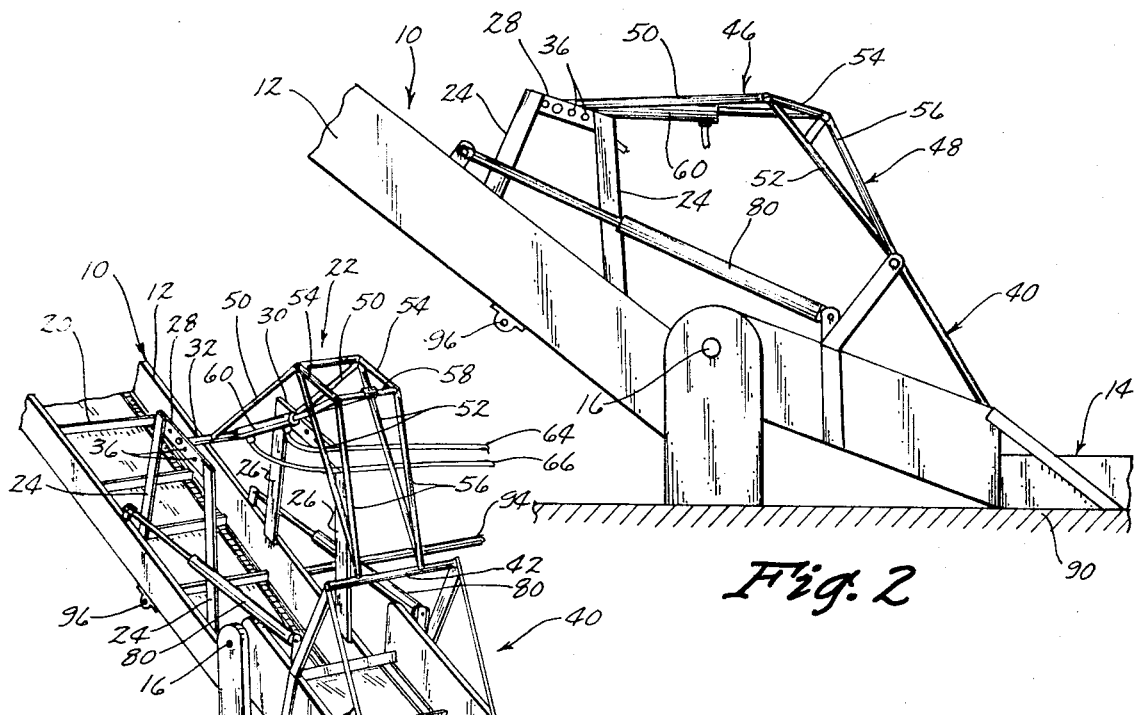
Fig. 2
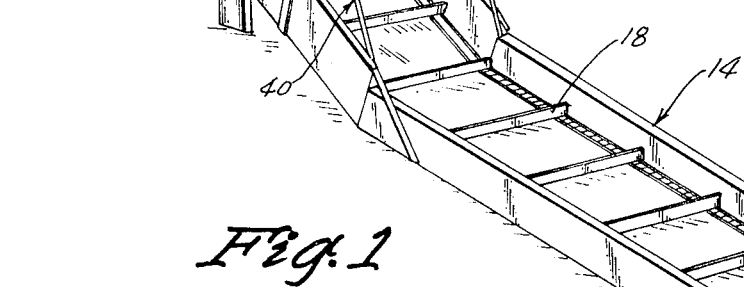
Fig. 1
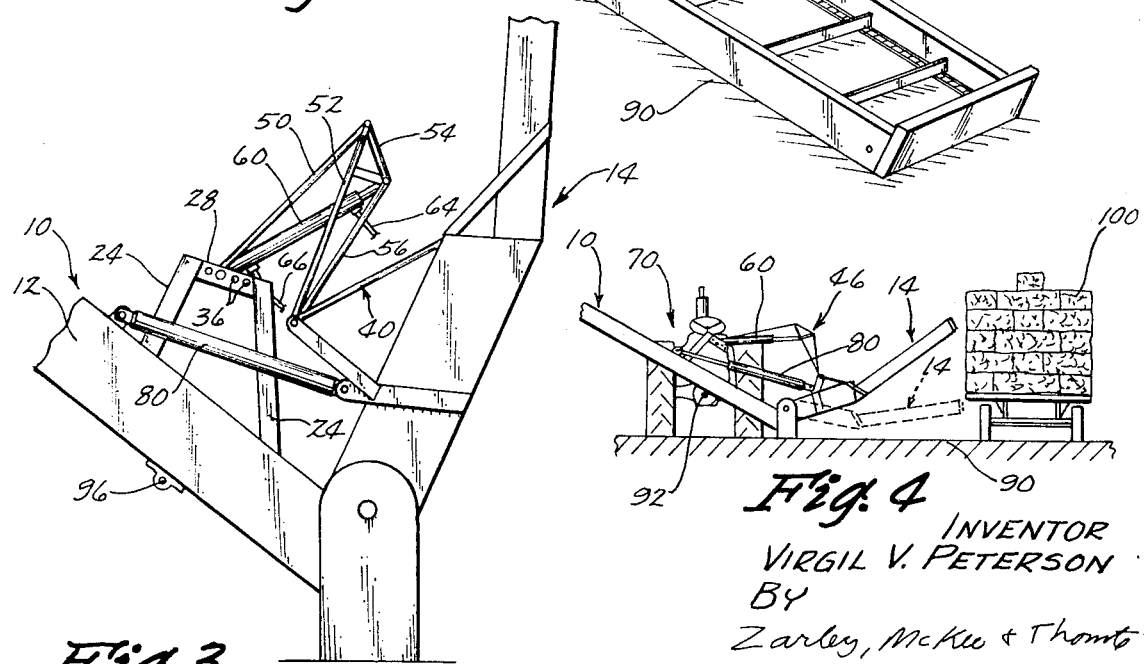
Fig. 3
Fig. 4
INVENTOR
VIRGIL V. PETERSON
BY
Zarley, McKee & Thomte
ATTORNEYS

HYDRAULICALLY OPERATED ELEVATOR FEEDER

The typical farm elevator involves placing the feeder section on the ground and manually moving bales of hay or the like from a filled wagon into the feeder section. This may involve dropping the bales of hay several feet to reach the feeder section of the elevator. Also the feeder section of an elevator when placed behind a wagon box filled full of grain is frequently too low allowing for considerable spillage of grain on the ground.

The elevator of this invention includes a hydraulically operated elevator feeder section which permits through the use of hydraulic double acting power cylinder to position the feeder section at any desired angle such that it may be varied as a load of baled hay for instance is unloaded thereby maintaining the feeder section at the level of the top layer of bales on the wagon or the like. Similarly, the feeder section may be raised and held at the desired elevation behind any grain wagon being unloaded into the feeder section.

A tractor may be used to drive the conveyor chain on the elevator by using the power take-off and additionally the hydraulic system on the tractor may be connected to the double acting power cylinder for operating the feeder section of the elevator.

The connecting members provided between the inclined elevator section and the feeder section are simple in construction and arrangement but yet sufficiently strong to withstand continuous hard usage. A pair of telescoping guide members are provided on opposite sides of the elevator for pivotally interconnecting the elevator and feeder sections.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary perspective view of the hydraulically operated elevator feeder section of this invention wherein the feeder section is in its lowered position on the ground;

FIG. 2 is a fragmentary side elevational view thereof;

FIG. 3 is a fragmentary side elevational view similar to FIG. 2 but showing the feeder section in its raised position; and FIG. 4 is a reduced in scale fragmentary side elevational view of the elevator in use and showing the feeder section in several positions as required for unloading a load of baled hay and additionally showing a tractor for driving the conveyor chain through the power take-off on the tractor and operating the double acting power cylinder through the hydraulic system on the tractor.

The elevator of this invention is referred to generally in FIG. 1 by reference numeral 10 and includes an upwardly incline elevator section 12 to which a feeder section 14 is pivotally connected about a pivotal axis 16. A conventional conveyor 18 is provided in the feeder section 14 and feeds a conveyor 20 in the inclined elevator section.

The hydraulic power structure and system for selectively raising and lowering the feeder section 14 is referred to generally by the reference numeral 22 and includes a pair of upstanding frame members 24 and 26 on opposite sides of the inclined elevator section 12. A member 28 interconnects the top ends of the frame members 24 while a member 30 performs the same function for the frame members 26. A cross member 32 is provided between the members 28 and 30 and is selectively positioned in alignment with the desired connection openings 36.

The feeder section 14 also includes an upstanding triangular shaped frame member 40 on each side thereof interconnected at its top apex end by a cross member 42. The cross members 32 and 42 are interconnected by connecting members 46 and 48. The connecting members 46 include a pair of side members 50 while the connecting unit 48 includes opposite lower side members 52 and angularly arranged top members 54 and 56 interconnected by a crossbar 58.

A double acting power cylinder 60 is pivotally connected between the cross member 32 and the cross member 58. The double acting cylinder 60 includes a piston 62 movable in response to hydraulic fluid being introduced into the cylinder through conduits 64 and 66 connected at opposite ends of the cylinder and in turn connected to the hydraulic system on a tractor 70 as seen in FIG. 4. Thus it is seen that positive control over the lifting operation of the feeder section 14 is maintained through the hydraulic system of the tractor 70 and the feeder section 14 may be maintained at any desired angle as indicated by the solid and dash lines in FIG. 4.

To further strengthen the elevator and its pivotal connection between the elevator section 12 and the feeder section 14 a pair of telescoping guide members 80 are provided on opposite sides and are pivotally connected to the inclined elevator section 12 and the feeder section 14. As seen in FIG. 1, they are fully extended when the feeder section 14 is on the ground 90 and fully contracted when the feeder section is in its fully raised up position. These telescoping guide members may also serve to dampen the movement of the feeder section as it is pivoted up and down by the hydraulic cylinder 60.

The conveyors 18 and 20 may be powered by the power take-off 92 on the tractor 70 connected to a drive shaft 94 mounted in a bearing block 96 under the incline elevator section 12. Accordingly, power for driving the conveyors and the hydraulic cylinder are both supplied by a single power source as seen by use of the tractor 70 in FIG. 4.

In operation it is seen that the feeder section 14 is pivoted to an upright raised position as seen in FIG. 3 and a load of baled hay 100 is driven into position adjacent the elevator feed section 14 such that as seen in the solid line position of FIG. 4, the outer end of the feeder section 14 is adjacent the top layer of bales. As the load becomes smaller the hydraulic system on the tractor 70 is operated to lower the feeder section 14 and hold it as desired as indicated by the dash line position in FIG. 4. In this manner the lifting of the bales is minimized since the feeder section 14 can always be maintained at the desired elevation closest to the hay being unloaded at a given moment. Upon completion of the unloading of the baled hay 100 the feeder section 14 is fully raised to the position of FIG. 3 and the elevator 10 will then be ready for another load of baled hay at which time the sequence is repeated wherein the feeder section 14 is lowered to a position similar to the solid line position of FIG. 4. The conveyors 18 and 20 are of course driven by the power take-off on the tractor 70. It is noted that the unique structure interconnecting the feeder section 14 and the incline raised elevator section 12 is sufficiently strong to endure the greater strains imposed on the feeder section 14 as it is operated in a raised position rather than always being on the solid ground 90 as seen in FIG. 1.

I claim:

1. A hydraulic power means for an elevator having an inclined conveyor section extending from the ground to an elevated station and an elevator feeder section pivoted at one end to the lower end of said inclined conveyor section;

said hydraulic power means comprising;

first and second upstanding frame members rigidly connected to said conveyor and feeder sections respectively, said frame members being spaced from the pivotal axis between said conveyor and feeder sections;

first and second connecting members pivotally secured to said first and second frame members respectively, said first and second connecting members being pivotally connected to each other;

a two-way hydraulic cylinder having a first end pivotally connected to one of said connecting members and having a second end pivotally connected to the other of said connecting members;

hydraulic conduit means in communication with said power cylinder for introducing hydraulic fluid to said cylinder for moving said feeder section to any desired pivotal position with respect to the ground.

2. A hydraulic power means according to claim 1 wherein said first end of said hydraulic cylinder is pivoted about an axis coincident with the pivotal axis between said one connecting member and one of said frame members connected thereto.

3. The structure of claim 1 wherein said connecting members extend upwardly and inwardly towards each other throughout the pivotal movement of said feeder section between raised and lowered positions.

4. The structure of claim 3 wherein each of said connecting members include side members interconnected at their upper and lower ends by cross members, and said power cylinder is further defined as extending from the lower cross member of said one connecting member to a cross member intermediate the ends of said other connecting member.

5. The structure of claim 1 wherein telescoping guide members are provided on opposite sides of said elevator extending between said conveyor section and said feeder section.

6. A hydraulic power means according to claim 1 wherein one of said upstanding frame members includes a plurality of connection openings therein for permitting one of said connecting members to be selectively pivotally connected thereto at a plurality of positions.

7. The structure of claim 1 wherein said power cylinder is the only means for holding said feeder section in a raised position.

* * * * *